G. FURUHOLMEN.
AUTOMATIC POWER ACTUATING DEVICE FOR STOVES, FURNACES, AND THE LIKE.
APPLICATION FILED FEB. 5, 1916.
1,330,795.
Patented Feb. 17, 1920.
3 SHEETS—SHEET 1.
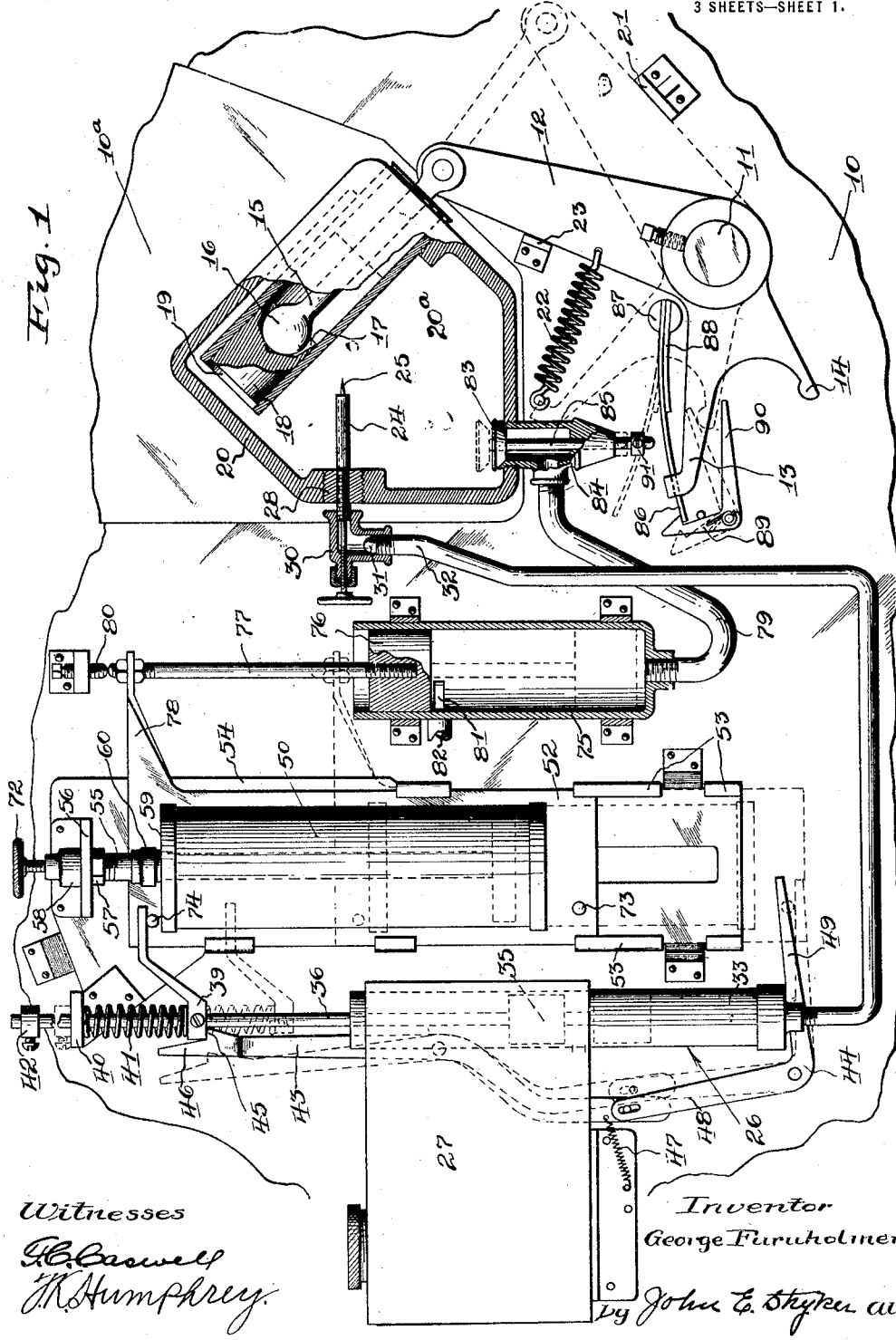
Witnesses
Inventor
George Furuholmen
by John E. Stryker atty

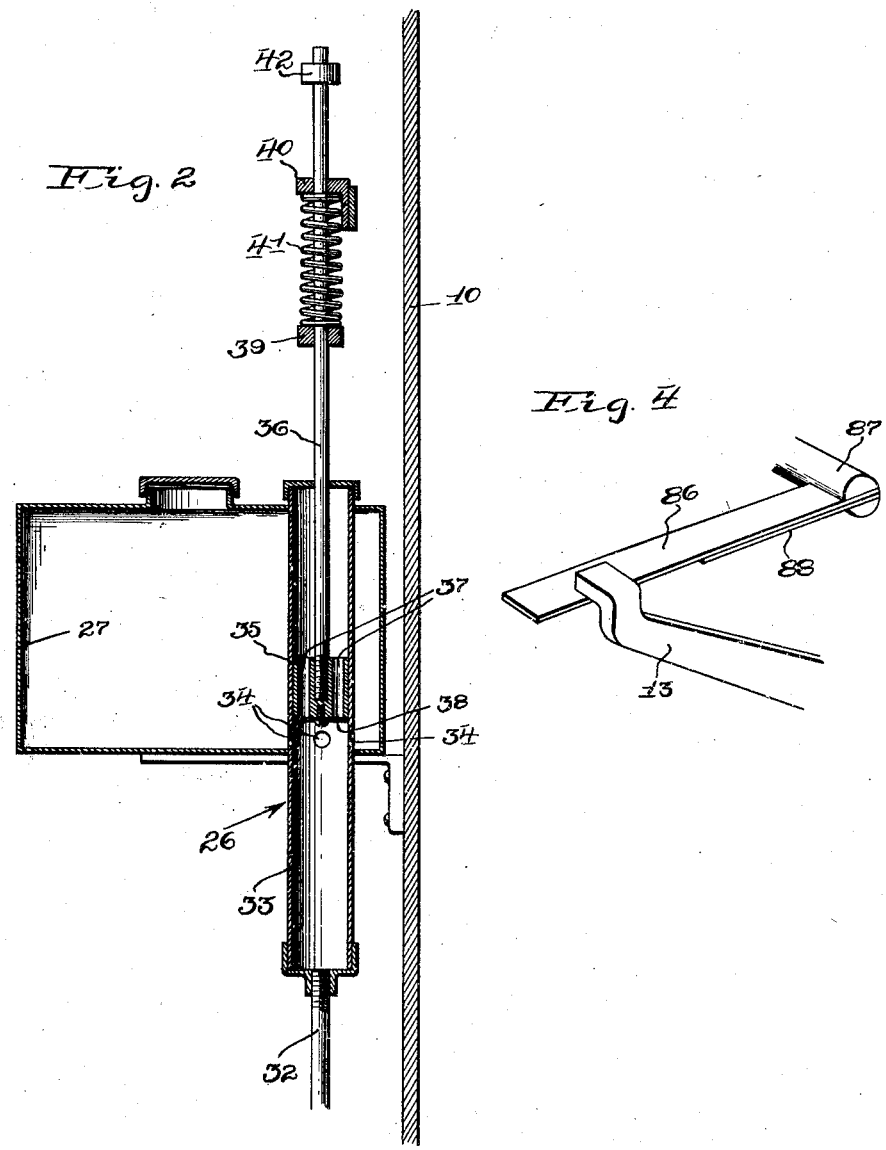

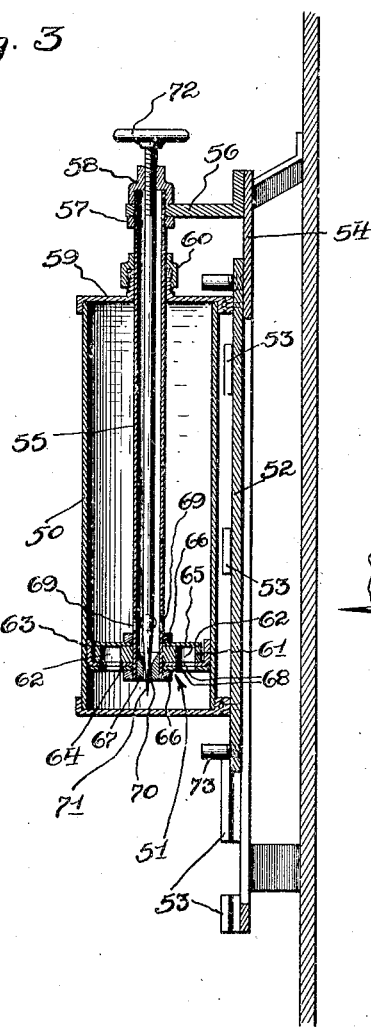
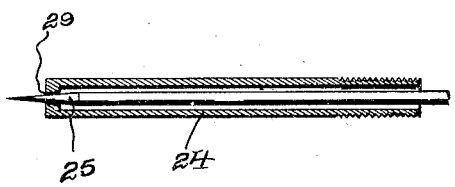

UNITED STATES PATENT OFFICE.

GEORGE FURUHOLMEN, OF MINNEAPOLIS, MINNESOTA.

AUTOMATIC POWER-ACTUATING DEVICE FOR STOVES, FURNACES, AND THE LIKE.

1,330,795. Specification of Letters Patent. Patented Feb. 17, 1920.

Application filed February 5, 1916. Serial No. 76,356.

*To all whom it may concern:*

Be it known that I, GEORGE FURUHOLMEN, a subject of the King of Norway, residing at Minneapolis, in the county of Hennepin and State of Minnesota, have invented new and useful Improvements in Automatic Power-Actuating Devices for Stoves, Furnaces, and the like, of which the following is a specification.

My invention relates to improvements in automatic power actuating devices for stoves, furnaces and the like, and is adapted particularly, though not exclusively, to actuate the power shafts of stoves of the class illustrated and described in my Patent No. 1,249,945, of December 11, 1917, and in copending application for patent filed by me on July 6, 1915, and bearing Serial Number 38,114.

It is the object of my present invention to provide an efficient steam actuating device for the fuel feeding mechanism and other moving parts of a stove or furnace, and the device is designed to operate at predetermined intervals as may be desired.

A further object is to supply a steam actuating device of this kind having water injecting mechanism therefor and adjustable timing means for said injecting mechanism, said device being adapted to operate said injecting mechanism and timing means to automatically reset the same preparatory to each primary movement.

My invention also include various novel features of construction which are hereinafter particularly described and pointed out in the claims.

In the drawings, Figure 1 is an assembled view in elevation of my improved device, portions thereof being cut away to show the structure of several otherwise concealed parts; Fig. 2 is a detail vertical sectional view taken through the water supply tank and the pump of the water injecting mechanism; Fig. 3 is a vertical sectional view taken through the timing device and illustrates in detail the various parts thereof; Fig. 4 is a detail perspective view illustrating the spring bar, which moves the exhaust valve, and a portion of the arm which bends said bar; and Fig. 5 is a central longitudinal sectional view of the injector nozzle and shows the needle valve for regulating the flow of water from said nozzle.

Referring to the accompanying drawings, I have used the reference numeral 10 to indicate the end of a stove to which my device is attached and the numeral 10$^a$ to designate the end wall of the fire box. In stoves of the class referred to in my applications above mentioned, an operating rock-shaft 11 protrudes from one wall of the stove and it is to this shaft that actuating devices are attached for oscillating the same. To said shaft 11, I secure a power arm 12 having at one end a finger 13 and lug 14, the purpose of said finger and lug being later hereinafter explained. Said power arm 12 is connected with a pitman rod 15 formed at its end with a ball 16, adapted to rest in a socket 17 in a piston 18, which is contained in an upwardly inclined cylinder 19 opening at one end into a housing 20, inclosing a steam generating compartment 20$^a$. This housing is in contact with the end of the fire box 10$^a$ from which said housing is heated. Steam generated in the compartment 20$^a$ forces the piston 18 downward and operates through the pitman 15 to swing the power arm 12 to position against the stop 21, as shown by dotted lines in Fig. 1. A coiled spring 22 attached at one end to the wall 10 of the stove and secured at its other end to said arm 12 draws the arm back to initial position (heavy lines, Fig. 1) against the stop 23 and in so doing returns the piston 18.

I provide water injecting mechanism to supply the steam generating housing 20 with water and also furnish adjustable timing means to regulate the operation of said injecting mechanism.

The water injecting mechanism comprises essentially a nozzle 24 inserted through the rear wall of the housing 20, a needle valve 25 to regulate the flow of water from the nozzle, a pump 26 communicating with said nozzle and a storage tank 27 to supply said pump with water. The nozzle 24 is a tube threaded in a plug 28 in the housing 20. This nozzle has a restricted opening 29 at the end within the housing, and the needle valve 25, which is threaded in a pipe connection 30 on said nozzle 24, adjusts the size of the opening 29. A ball valve 31 within the pipe connection 30 is normally seated in the open end of a tube 32 which leads to the pump casing 33. Said ball valve 31 is lifted during the working stroke of the pump and permits the passage of water to the nozzle 24, but at other times said valve is seated by gravity and seals the tube 32 against back pressure from the steam generating housing 20. The pump casing 33 passes through the tank 27 and communicates therewith through openings 34 in said casing near the bottom of said tank. The plunger in the pump comprises a plunger head 35 and plunger rod 36. The plunger head 35 is threaded on the rod 36 and fits snugly in the pump casing 33 and said plunger head is formed with a number of longitudinal openings 37 therein which are closed by a clapper valve 38, when the head is forced downward, and opened when said plunger head is lifted. It will thus be seen that the valved plunger head 35 acts upon the water in the pump casing only upon its downward stroke, at which time water is forced from the pump casing 33 through the pipe 32 and out of the nozzle 24. Compressed between an adjustable arm 39 on the plunger rod 36 and a bracket 40, which slidably receives said rod, is a coiled spring 41 adapted to force the rod downward, and on said rod 36, above the bracket 40, is an adjustable collar 42 employed to limit the downward thrust of the plunger. The plunger rod 36 is lifted by the timing device as will be hereinafter described and is secured in elevated position against the action of the spring 41 by a latch bar 43 which is tripped through a bell crank 44 by said timing device. The latch bar 43 is pivoted near its center in upright position and is supplied with a catch 45, adapted to pass beneath the arm 39 and said bar 43 is also furnished with a stop 46 to limit its movement which is caused by a coiled spring 47 secured thereto. The bell crank 44 has one of its arms 48 in slidable pivotal connection with the lower end of the latch bar 43 and the other arm 49 of said bell crank rests in the path of the timing device, which will now be described.

The timing device is a vertically reciprocating mechanism designed to be lifted by power and adapted to fall by gravity. Said device, when depressed, releases the spring operated plunger in the pump and, when elevated, returns said plunger. This timing device comprises essentially a vertically-reciprocatory cylinder 50 filled with water or other fluid, and a stationary piston 51 inclosed in said cylinder. Said piston has an adjustable opening therein to permit the fluid to pass downward through the piston and control the descent of the cylinder as it falls by gravity and also has comparatively large valved openings to allow a rapid upward flow of the liquid through said piston and permit the cylinder to be lifted. Said cylinder 50 is secured upon a slide 52 movable vertically between guides 53 on a bracket 54, secured to the side of the stove.

A tubular piston rod 55 is threaded at its upper end in a lug 56 on the bracket 54 and is secured with respect to the lug by means of lock nuts 57 and 58 abutting opposite sides of said lug. This piston rod passes through the upper head 59 of the cylinder 50, upon which a screw-gland 60 is threaded to prevent the escape of the fluid. Upon the lower end of said hollow piston rod and within the cylinder 50, I secure the piston 51, which includes an annular metal head 61 with perforations 62 therein, a cup 63 of flexible material, such as rubber or leather, which envelops the end of said head, a reinforcing disk 64 beneath said cup, a flexible clapper valve 65 on the upper side of said perforated head, nuts 66 on the piston rod between which all of said parts are secured and a perforated plug 67 in the end of the hollow piston rod 55. The cup 63 and reinforcing disk 64 are perforated at 68 to register with the perforations 62 in the head 61. Immediately above the piston 51, I form openings 69 in the hollow piston rod 55, and liquid flows from the upper part of the cylinder into said hollow rod, thence downwardly through the bore 70 in the plug 67. To regulate the flow of liquid through the bore 70, a needle valve 71 is provided which is threaded in the nut 58 and supplied with a finger button 72 for turning the same. At the lower end of the slide 52 is a pin 73 arranged to strike the arm 49 when the slide has reached its lower limit, and release the latch bar 43 from engagement with the plunger rod 36 of the pump. A similar pin 74 near the upper end of said slide is arranged to bear beneath the arm 39 on said plunger rod and raise the same when the slide 52 is lifted.

To lift the cylinder 50 and incidentally the plunger rod 36, I supply an upright supplemental cylinder 75 with a piston 76 having a piston rod 77 secured to an arm 78 on the slide 54. Steam from the generating housing 20 is introduced through the steam duct 79 at the bottom of said cylinder and forces the piston upward to a position engaging the rod 77 with the adjustable stop 80. An exhaust port 81 near the top of the cylinder permits the escape of steam through the outlet pipe 82, which I prefer to lead into the flue of the stove.

A valve 83 seated in the upper end of a valve casing 84, communicating with the generating housing 20 and steam duct 79, is supplied with a valve stem 85 which slides vertically in said casing and protrudes beneath it. This valve is lifted from its seat when the power arm 12 reaches the end of its working stroke to relieve the pressure within the housing 20 and cause the operation of the supplemental piston 76. A spring bar 86, fixed at one end in the split stud 87 and reinforced by a shorter spring bar 88, is designed to lift and hold the valve 83 in elevated position, as shown in dotted lines in Fig. 1. Said bar rests in the path of the finger 13 on the power arm 12 and is bent downward by said finger where it is caught by a spring latch 89 and held to permit the seating of the valve 83. An arm 90 on said spring latch lies in the path of the lug 14 and is moved by said lug to release the latch 89 and free the bar 86, the latter being adapted to spring back to normal position and raise the valve. The upward thrust of the valve stem 85 is limited by an adjustable collar 91 secured to said stem and arranged to strike the lower end of the valve casing.

In describing the operation of my device, it seems desirable to refer first to the slide 52 which gradually descends until the fluid within the cylinder 50 passes through the piston 51, at which time said slide reaches its lower limit, the pin 73 thereon striking the arm 49 of the bell crank 44, thereby releasing the catch 45 from the arm 39 on the plunger rod. The spring 41 then depresses the plunger 36, which forces water through the pipe 32 past the ball valve 31 and out of the nozzle 24 against the hot walls of the generating housing 20. The spray from the nozzle is converted into steam and when its expansive power becomes great enough to overcome the pressure against the piston 18, said piston is moved and the power arm 12 swung to the end of its stroke. Just before reaching such position, the lug 14 on said arm releases the catch 89 which secures the end of the bar 86 and said bar springs upward and opens the valve 83. The steam from the generating housing 20 passes through the steam duct 79 and lifts the supplemental piston 76, whose upward movement causes the elevation of the slide 52 and also raises the plunger rod 36 through the engagement of the pin 74 beneath the arm 39 on said rod. The upward movement of the supplemental piston 76 is arrested when the piston rod 77 strikes the stop 80 and the steam beneath said piston is allowed to escape through the exhaust port 81. The slide 52 then begins to descend, but the plunger rod 36 is secured in elevated position by the latch bar 43, as shown in solid lines in Fig. 1, until later released by the slide 52. When the pressure within the steam generating housing is relieved, the coiled spring 22, (or other suitable means which may be supplied) draws the power arm 12 back to original position (solid lines, Fig. 1). During the return of said arm, the finger 13 catches the end of the spring bar 86 and bends it downward until caught by the yielding latch 89, thus allowing the valve 83 to close, preparatory to the next steam generating period. The valve stem 85 is proportioned so that the valve 83 closes a short time before the piston 18 reaches the end of its return stroke and said piston is retarded by compression during the remainder of the stroke, thus avoiding shocks to the mechanism which would otherwise occur by reason of the impact of the power arm 12 against the stop 23.

The downward thrust of the plunger rod 36, above described, continues only until the arm 39 thereon is caught and raised by the pin 74 on the slide 52. The strokes of said plunger are, therefore, not uniform, because the quantity of water required to supply sufficient steam pressure to move the piston 18 varies according to the temperature of the housing 20.

The needle valve 71 in the timing device may be adjusted to control the flow of fluid through the bore 70 in the plug 67 in said piston 51, thus determining the time required to depress the slide 52, and the needle valve 25 in the nozzle 24 may also be adjusted to determine the volume of water to be sprayed against the walls of the generating housing 20. Adjustment of the needle valve 25 in the nozzle 24 shortens or lengthens the period between the time of release of the plunger rod 36 and the completion of the working stroke of the piston, and thereby provides the requisite amount of fluid to produce adequate steam, without too forcible movement of the piston.

It will be observed, as above described, that my device takes entire care of itself, requiring no attention after being once put in operation.

Having described my invention, what I claim as new and desire to protect by Letters Patent, is:

1. In a device of the class described, the combination with a stove, of a cylinder, a piston in said cylinder in operative connection with the stove mechanism, a steam generating compartment communicating with said cylinder, means to inject water into said generating compartment and independent mechanism to time the operation of said injecting means.

2. In a device of the class described, the combination with a stove, of a cylinder, a steam generating compartment communicating with said cylinder, a piston in said cylinder in operative connection with the stove mechanism and adapted to be driven in one direction by steam, means to return said piston, a pump having a spring pressed plunger adapted to inject water into said steam generating compartment, controllable timing mechanism to release said plunger at predetermined times without regard to the movement of the piston, and means to return said plunger at the end of the working stroke of said piston.

3. In a device of the class described, the combination with a stove, of a cylinder, a piston in said cylinder in operative connection with the mechanism of the stove, a steam generating compartment in communication with the cylinder and adapted to supply steam for moving the piston in one direction, yielding means to return said piston, and a pump to intermittently inject charges of water into said compartment, said pump being adapted to operate without regard to the movement of the piston.

4. In a device of the class described, the combination with a stove, of a cylinder, a piston in said cylinder in operative connection with the stove mechanism, a steam generating compartment communicating with said cylinder, a pump having a spring pressed plunger adapted to inject water into said steam generating compartment, timing mechanism to release said plunger at predetermined times without regard to the movement of said piston, and means to return said plunger.

5. In a device of the class described, the combination with a stove, of a cylinder, a piston in said cylinder in operative connection with the stove mechanism, a steam generating compartment communicating with said cylinder and adapted to supply steam to move said piston in one direction, means to return said piston, a pump having a spring pressed plunger adapted to inject water into said steam generating compartment, a catch to secure said plunger against the action of its spring, timing mechanism adapted to fall by gravity and release said plunger at predetermined times, and means to return said plunger and timing mechanism at the end of the working stroke of said piston.

6. In a device of the class described, the combination with a stove, of a cylinder, a steam generating compartment communicating with said cylinder, a power piston, in operative connection with movable stove mechanism, adapted to be driven in one direction by steam within said cylinder, yielding means to return said piston, a pump having a spring pressed plunger to inject water into said steam generating compartment, timing mechanism adapted to fall by gravity and release said plunger, a supplemental cylinder, a supplemental piston in said cylinder connected with said timing mechanism and adapted to raise the same and means to direct the steam from said compartment into said supplemental cylinder at the completion of the working stroke of the power piston.

7. In a device of the class described, the combination with a stove, of a cylinder, a piston therein, in operative connection with movable mechanism of said stove, a steam generating compartment communicating with said cylinder, a pump communicating with said compartment and having a reciprocating plunger therein, a spring to drive the plunger in one direction to inject water into said compartment, means to permit the escape of steam from said compartment, and means operated by said exhausting steam to return the plunger against the action of said spring when the piston reaches the end of its working stroke.

8. In a device of the class described, the combination with a stove, of a cylinder provided with a piston in operative connection with movable parts of said stove, a steam generating compartment communicating with said cylinder, a pump communicating with said compartment and having a reciprocating plunger therein, a spring to drive the plunger in one direction to inject water into said compartment, a catch to secure the plunger against the action of said spring, a vertically slidable timing cylinder adapted to fall by gravity and containing a liquid, a valved stationary piston in said timing cylinder designed to permit the measured flow of liquid therethrough to regulate the descent of the cylinder, said valve being also adapted to allow a rapid reverse flow of said liquid to permit the elevation of said cylinder, means to release the catch when the timing cylinder is depressed and means to elevate the cylinder and return said plunger.

9. In a device of the class described, the combination with a stove, of a cylinder having a power piston therein, in operative connection with the mechanism of said stove, a steam generating compartment communicating with one end of said cylinder, a pump communicating with said compartment and having a reciprocating plunger therein, a spring to drive the plunger in one direction to inject water into said compartment, a catch to secure the plunger against the action of said spring, a vertically slidable timing cylinder adapted to fall by gravity and containing a liquid, a valved stationary piston in said cylinder designed to permit the measured flow of liquid therethrough and thereby regulate the descent of the cylinder, said piston also being adapted to allow a rapid reverse flow of said liquid to permit the elevation of said cylinder, means actuated by the timing cylinder to release the catch when said cylinder is depressed and means to elevate the cylinder and return said plunger.

10. In a device of the class described, the combination with a stove, of a cylinder, a steam generating compartment communicating with one end of said cylinder, a pump communicating with said compartment and having a reciprocating plunger therein, a spring to drive the plunger in one direction to inject water into said compartment, a catch to secure the plunger against the action of said spring, a vertically slidable timing cylinder adapted to fall by gravity and containing a liquid, a valved stationary piston in said cylinder designed to permit the measured flow of liquid therethrough to regulate the descent of the cylinder, said piston being also adapted to allow a rapid reverse flow of said liquid to permit the elevation of said cylinder, means to release the catch when the timing cylinder is depressed, a power piston in said first mentioned cylinder in operative connection with the mechanism of the stove and adapted to be driven in one direction by steam, yielding means to return said piston, a supplemental cylinder having a piston therein in connection with the timing cylinder and adapted to raise the same, means to direct the steam from said generating compartment to said supplemental cylinder upon the completion of the working stroke of said power piston and connections between said timing cylinder and plunger to lift the latter when the former is raised.

11. In a device of the class described, the combination with a stove, of a cylinder, a steam generating compartment communicating with one end of said cylinder, a pump communicating with said compartment and having a reciprocating plunger therein, a spring to drive the plunger in one direction to inject water into said compartment, a catch to secure the plunger against the action of said spring, a vertically slidable timing cylinder adapted to fall by gravity and containing a liquid, a valved stationary piston in said cylinder designed to permit the measured flow of liquid therethrough to regulate the descent of the cylinder, said piston being also adapted to allow a rapid reverse flow of said liquid to permit the elevation of said cylinder, means to release the catch when the timing cylinder is depressed, a piston in said first mentioned cylinder in operative connection with the mechanism of the stove and adapted to be driven in one direction by steam, yielding means to return said piston, a supplemental cylinder having a piston therein in connection with the timing cylinder and adapted to raise the same and means to direct the steam from said generating compartment to said supplemental cylinder upon the completion of the working stroke of said power piston.

12. In a device of the class described, the combination with a stove, of a cylinder, a steam generating compartment communicating with one end of said cylinder, a pump communicating with said compartment and having a spring pressed plunger therein to inject water into said compartment, a catch to secure the plunger, a lever to operate and release said catch, a vertically reciprocating slide adapted to fall by gravity, a timing cylinder on said slide containing a liquid, a valved stationary piston in said cylinder designed to permit the measured flow of liquid therethrough to regulate the descent of the slide, said piston being also adapted to allow a rapid reverse flow of said liquid to permit the elevation of said slide, a pin on the slide arranged to strike said lever and unlatch the catch when said slide is depressed, a power piston in said first mentioned cylinder in operative connection with the mechanism of the stove and adapted to be driven in one direction by steam, yielding means to return said piston, a supplemental cylinder having a supplemental piston therein in connection with the slide and arranged to raise the same, means to direct the steam from said generating compartment to said supplemental cylinder upon the completion of the working stroke of said power piston, an arm on the plunger and a second pin on said slide arranged to engage said arm and return the plunger to latched position.

13. In a device of the class described, the combination with a stove having a rock-shaft to operate the mechanism thereof, of a cylinder, a steam generating compartment communicating with one end of said cylinder, a pump to intermittently inject water into said compartment, a vertically slidable timing cylinder containing a liquid and adapted to fall by gravity, said cylinder being employed to initiate the operation of said injecting means, a valved stationary piston in said cylinder designed to permit the measured flow of liquid therethrough to regulate the descent of the cylinder, said piston being also adapted to allow a rapid reverse flow of said liquid to permit the elevation of said cylinder, a power piston in said first mentioned cylinder driven in one direction by steam, a power arm on said rock-shaft, a pitman connecting said piston and arm, yielding means to return said piston, a supplemental cylinder having a piston therein in connection with the timing cylinder and adapted to raise the same, a valve casing communicating with the generating compartment, a steam duct leading from said valve casing to the supplemental cylinder, a valve stem slidable in the casing, a valve head on said stem adapted to be seated in said casing, a spring bar arranged to strike said stem and raise said valve, a finger on the power arm to bend the spring and permit the closing of the valve during the return stroke of the power piston, a catch to secure said spring bar and a lug on said arm to release said catch at the completion of the working stroke of said power piston, whereby said spring is permitted to open the valve.

14. In a device of the class described, the combination with a stove, of a cylinder, a steam generating compartment communicating with the cylinder, a power piston in said cylinder in operative connection with movable parts of the stove, a pump to inject water into said compartment, a vertically slidable timing cylinder containing a liquid and adapted to fall by gravity, means to raise the cylinder, said cylinder being adapted to coöperate with said pump to initiate the operation thereof, a stationary piston in said cylinder having openings therein, an adjustable valve for one opening, said opening being designed to permit the measured flow of liquid through the piston and regulate the descent of the cylinder, and a valve for the other openings arranged to allow a rapid reverse flow of said liquid through said piston and permit the elevation of said cylinder.

15. In a device of the class described, the combination with a stove, of a cylinder, a steam generating compartment communicating with said cylinder, means to inject water at predetermined times into said compartment, a piston in said cylinder driven in one direction by steam and operatively connected with the stove mechanism, yielding means to return said piston, a valve to relieve the pressure within said compartment, means to open the valve at the completion of the working stroke of said piston and to close said valve during the return of said piston to thereby retard such movement by compression within said compartment.

Whereof, I have hereunto subscribed my name to this specification.

GEORGE FURUHOLMEN.